Patented Sept. 8, 1942

2,294,968

UNITED STATES PATENT OFFICE 2,294,968

DYESTUFFS AND PROCESS OF COLORING

George Holland Ellis and Frank Brown, Spondon, near Derby, England, assignors to Celanese Corporation of America, a corporation of Delaware No Drawing. Application August 19, 1939, Serial No. 291,005. In Great Britain August 29, 1938

6 Claims. (Cl. 260—377)

This invention relates to the production of new dyes suitable for coloring cellulose acetate and other organic derivatives of cellulose, e. g., cellulose esters of organic acids and cellulose ethers, and to processes of coloring said materials therewith.

It has been found that the anthraquinone-2-carboxylic amides substituted in the 1- and 4-positions by two amino groups or an amino group and a hydroxy group, and of which the amide groups carry single monohydroxyalkyl groups as substituents, the said compounds being free from other substituents carrying hydroxy groups and from substituents carrying basic amino groups, are valuable dyes for cellulose acetate and other cellulose esters and ethers. The invention is concerned with these products and with processes for their manufacture.

According to the present invention the aforesaid new diamino-anthraquinone-2-carboxylic amides or amino-hydroxy-anthraquinone-2-carboxylic amides are obtained by the action of an alkylamine containing a single hydroxy group and having at least one hydrogen atom attached directly to the amino group, upon anthraquinone-2-carboxylic chlorides, having in the 1- and 4-positions either two amino groups or an amino group and a hydroxy group, the said anthraquinone-2-carboxylic chlorides being free from substituents carrying hydroxy groups or basic amino groups.

The hydroxyalkylamine must contain but one hydroxyl group and must have at least one hydrogen atom attached to the amine nitrogen. Hence, it must be either a primary amine consisting of ammonia having one of its hydrogen atoms replaced by a monohydroxyalkyl group or a secondary amine consisting of ammonia having one of its hydrogen atoms replaced by a monohydroxyalkyl group and a second by another substituent which does not contain a hydroxyl group. Examples of such hydroxyalkylamines are monoethanolamine, mono-(β-hydroxy-propyl)-amine, mono-(γ-hydroxy-propyl)-amine and methyl-β-hydroxyethyl-amine.

When a nuclear amino group or groups of the anthraquinone-2-carboxylic chloride carries a substituent, such substituent can be, for example, a simple alkyl group, e. g. methyl or ethyl, a cyclo-alkyl group, e. g. cyclohexyl, an aryl group, e. g. phenyl, o-, m- or p-tolyl, methoxy-phenyl or acetyl-amino-phenyl, or an aralkyl group, e. g. the benzyl group.

As examples of 1:4-diamino-anthraquinone-2-carboxylic-chlorides, suitable as parent materials for the manufacture of the new anthraquinone-carboxylic-hydroxyalkyl amides, may be mentioned the following:

1:4-diamino-anthraquinone - 2 - carboxylic-chloride.
1-amino-4-phenylamino-anthraquinone-2-carboxylic-chloride.
1-amino-4-p-tolylamino-anthraquinone-2-carboxylic-chloride.
1-amino-4-m-tolylamino-anthraquinone-2-carboxylic-chloride.
1-amino-4-o-anisidino-anthraquinone-2-carboxylic-chloride.
1-amino-4-p-acetylamino-phenylamino - anthraquinone-2-carboxylic-chloride.
1-methylamino-4-phenylamino-anthraquinone-2-carboxylic-chloride.
1-methylamino-4-p-tolylamino-anthraquinone-2-carboxylic-chloride.
1-amino-4-cyclohexylamino-anthraquinone-2-carboxylic-chloride.

As an example of an anthraquinone-2-carboxylic-chloride having an amino group in one of the 1- and 4-positions and a hydroxy group in the other position, mention may be made of 1-amino-4-hydroxy-anthraquinone-2 or 3-carboxylic chloride and their N-alkyl or N-aryl derivatives.

By treatment with mono-ethanolamine or β-hydroxypropylamine these carboxylic chlorides are converted into the corresponding carboxylic mono-(hydroxyethyl)-amides or mono-(β-hydroxypropyl)-amides, as the case may be.

As mentioned above, the new anthraquinone-carboxylic-mono-(hydroxyalkyl)-amides of the present invention are valuable dyes for cellulose acetate and other cellulose esters and ethers. As compared with the analogous dyes in which the carboxylic amide group is unsubstituted or has a simple alkyl group or an aryl group as a substituent therein, the new dyes have an improved affinity for cellulose ester or ether materials. Moreover, their affinity is better than that of analogous dyes in which the carboxylic amide group contains more than one hydroxy-alkyl group or contains an alkyl group carrying two or more hydroxyl groups. Again, the affinity of the new dyes is better than that of analogous dyes containing hydroxy-alkyl groups as substituents in the nuclear amino groups in addition to a single mono-hydroxyalkyl group in the carboxylic amide group.

Of especial value as dyes for cellulose acetate and other cellulose esters and ethers are the 1- amino- or 1-alkyl-amino-4-arylamino-anthraquinone - 2 - carboxylic-mono -(hydroxy-alkyl)-amides, the aryls of which are of the benzene series. These dye cellulose acetate in blue shades which are less red than the analogous dyes which do not contain a carboxylic amide group in the 2-position. Further, they have extremely good fastness to light and to the combustion products of coal gas. A member of this class thus combines in a single dye a desirable shade of blue, very good affinity for cellulose acetate and very good fastness properties.

According to a further feature of our invention the new 1:4-diamino-anthraquinone-2-carboxylic-(monohydroxyalkyl)-amides, free from further substituents carrying hydroxy groups or basic amino groups, are obtained from anthraquinone-2-carboxylic-(monohydroxyalkyl)-amides having an amino group or a substituted amino group in one of the 1- and 4-positions and an acidylamino group, a nitro group, or a halogen atom in the other, by hydrolysis in the case of an acidylamino group, by reduction in the case of a nitro group, or by the action of an appropriate amine in the case of a nitro group or a halogen atom.

For example, a 1-amino- or 1-alkylamino-4-brom - anthraquinone - 2 - carboxylic-(monohydroxyalkyl)-amide can be allowed to react with an appropriate alkylamine, arylamine or cycloalkylamine so as to yield the corresponding 4-alkylamino-, 4-arylamino-, or 4-cycloalkylamino compound. 1-amino-4-phenylamino-anthraquinone-2-carboxylic - mono - (hydroxyethyl) - amide is readily obtained thus from aniline and 1-amino-4-brom-anthraquinone-2-carboxylic-mono - (hydroxyethyl)-amide. Further 1:4-diamino-anthraquinone-2-carboxylic mono-(hydroxyethyl)-amide can be obtained by hydrolysing 1-amino-4-p-toluenesulphamino-anthraquinone - 2 - carboxylic-mono-(hydroxyethyl)-amide, or by reducing 1-amino-4-nitro-anthraquinone-2-carboxylic-mono-(hydroxyethyl)-amide.

Again, according to the invention, an anthraquinone - 2 - carboxylic-mono-(hydroxyalkyl)-amide having a halogen atom in each of the 1- and 4-positions can be allowed to react with an appropriate amine so as to replace the halogen atoms by substituted amino groups. For example, 1:4-di-(methylamino)-anthraquinone-2-carboxylic-mono-(hydroxyethyl)-amide can be obtained by the action of methylamine on 1:4-dichlor-anthraquinone-2-carboxylic-mono - (hydroxyethyl)-amide; the latter compound is obtainable by stirring 1:4-dichlor-anthraquinone-2-carboxylic-chloride with a 20% aqueous solution of monoethanolamine for several hours at ordinary temperatures.

Still other methods are available for the manufacture of the dyes of the present invention. For example, they may be prepared by hydroxyalkylation (e. g. with ethylene chlorhydrin or other alkylene chlorhydrin) of the corresponding compounds in which the carboxylic amide group is unsubstituted or is mono-substituted by a group which is not a hydroxyalkyl group. Again, an appropriate 1:4-diamino-anthraquinone-2-carboxylic-ester, or an appropriate 1:4-di-amino-anthraquinone-2-carboxylic halide other than the chloride may be converted into a mono-hydroxy-alkylamide by the action of an amino-alcohol. Further, when introducing an amino group or a substituted amino group into the 1- or 4-position of an anthraquinone - 2 - carboxylic-(monohydroxyalkyl)-amide, instead of exchanging a halogen atom or a nitro group for an amino group or a substituted amino group, other groups capable of being replaced by amino or substituted amino by the action of ammonia or an amine, for example alkyloxy or aryloxy groups, may be exchanged by the action of ammonia or an appropriate amine.

As mentioned above, the new dyes are themselves valuable for the coloring of cellulose acetate or other cellulose esters or ethers. They can, however, be converted into sulphuric esters by the action of concentrated sulphuric acid or other sulphating agents. These sulphuric esters are likewise useful as dyes for cellulose esters and ethers and also as dyes for animal fibres such as wool or silk.

Our invention includes both the manufacture of the new dyes and the dyeing of cellulose acetate or other cellulose esters or ethers therewith. For dyeing the latter materials the dyes are advantageously applied thereto in the form of aqueous dispersions which can be prepared in any convenient way. For example, aqueous dispersions may be prepared with the aid of dispersing agents and/or protective colloids.

Our invention also includes preparations whether in powder, paste or other form, comprising the new dyes together with dispersing agents and/or protective colloids.

Apart from cellulose acetate, examples of cellulose esters or ethers which may be colored by the new dyes are cellulose formate, propionate and butyrate, and ethyl, methyl and benzyl cellulose.

The invention is illustrated by the following examples, the "parts" referred to being parts by weight:

*Example 1*

10 parts of 1-amino-4-phenylamino-anthraquinone-2-carboxylic acid is stirred with 100 parts of dry benzene and 7.5 parts of phosphorus pentachloride first for two hours at ordinary temperature and then for one hour at 60–70° C. After cooling the chloride of the carboxylic acid is filtered off, washed with benzene and dried. 5 parts of this acid chloride are then stirred for one hour at ordinary temperature with 20 parts of monoethanolamine and 40 parts of water, whereupon the 1-amino-4-phenylamino-anthraquinone - 2 - carboxylic-mono-(hydroxyethyl)-amide is filtered off, washed and dried. When applied in the form of an aqueous dispersion to cellulose acetate, for which it has very good affinity, it yields on the latter blue shades of excellent fastness to light and to combustion products from coal gas. The shades are also of very good fastness to other agencies which textile materials are commonly called upon to resist.

*Example 2*

10 parts of 1-amino-4-brom-anthraquinone-2-carboxylic-acid-chloride (prepared by the action of thionyl chloride on the corresponding carboxylic acid) are mixed with 240 parts of 20% aqueous mono-ethanolamine solution and stirred at room temperature for 8 hours. The 1-amino-4 - brom - anthraquinone-2-carboxylic-oxyethyl-amide so formed is then filtered off, washed with water and dried.

10 parts of this oxyethylamide are stirred at 130° C. for 8 hours with 40 parts of aniline, 6 parts of potassium acetate and 0.4 part of copper acetate. The product is then cooled and poured slowly into a mixture of 200 parts of concentrated hydrochloric acid and 800 parts of water. The dyestuff, which is the same as that prepared according to Example 1, is then filtered off and washed.

*Example 3*

10 parts of 1-amino-4-hydroxy-anthraquinone-2-carboxylic chloride is stirred with 40 parts of mono-ethanolamine and 160 parts of water for several hours at ordinary temperature. The 1-amino-4-hydroxy-anthraquinone-2-carboxylic-mono-(hydroxyethyl)-amide obtained is filtered off and washed. As an aqueous dispersion it dyes cellulose acetate in violet shades.

Having described our invention, what we desire to secure by Letters Patent is:

1. An anthraquinone-2-carboxylic amide of the formula

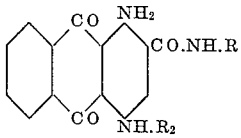

where R is a monohydroxyalkyl group and $R_2$ is a radicle selected from the group consisting of phenyl and tolyl.

2. An anthraquinone-2-carboxylic amide of the formula

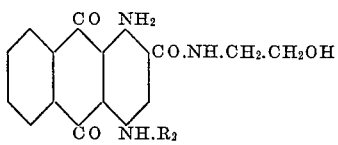

where $R_2$ is a radicle selected from the group consisting of phenyl and tolyl.

3. 1-amino-4-phenylamino-anthraquinone-2-carboxylic-mono-(hydroxyethyl)-amide.

4. Process for the production of anthraquinone-2-carboxylic amides, which comprises subjecting to the action of a primary alkylamine containing a single hydroxy group an anthraquinone-2-carboxylic chloride of the formula

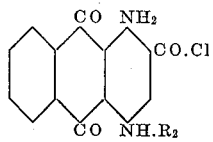

where $R_2$ is a radicle selected from the group consisting of phenyl and tolyl.

5. Process for the production of anthraquinone-2-carboxylic amides, which comprises subjecting to the action of monoethanolamine an anthraquinone-2-carboxylic chloride of the formula

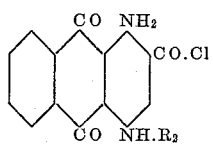

where $R_2$ is a radicle selected from the group consisting of phenyl and tolyl.

6. Process for the production of 1-amino-4-phenyl-amino-anthraquinone-2-carboxylic-mono-(hydroxyethyl)-amide, which comprises subjecting 1-amino-4-phenylamino-anthraquinone-2-carboxylic chloride to the action of monoethanolamine.

GEORGE HOLLAND ELLIS.
FRANK BROWN.